United States Patent
Le et al.

(10) Patent No.: US 10,272,872 B2
(45) Date of Patent: Apr. 30, 2019

(54) BELT ASSEMBLY ALLOWING PAYOUT MEASUREMENT

(71) Applicant: Ford Global Technologies, LLC, Dearborn, MI (US)

(72) Inventors: Jialiang Le, Canton, MI (US); Manoharprasad K. Rao, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 170 days.

(21) Appl. No.: 15/365,160

(22) Filed: Nov. 30, 2016

(65) Prior Publication Data
US 2018/0148014 A1     May 31, 2018

(51) Int. Cl.
*B60R 22/48* (2006.01)
*B60R 21/015* (2006.01)

(52) U.S. Cl.
CPC ........ *B60R 22/48* (2013.01); *B60R 21/01548* (2014.10); *B60R 2022/485* (2013.01); *B60R 2022/4825* (2013.01)

(58) Field of Classification Search
CPC ...... B60R 21/01548; B60R 2022/4825; B60R 2022/485
USPC ......................................................... 701/46
See application file for complete search history.

(56) References Cited

U.S. PATENT DOCUMENTS

| | | | |
|---|---|---|---|
| 5,433,014 A | 7/1995 | Falk et al. | |
| 5,553,804 A | 9/1996 | Hamann | |
| 6,203,059 B1* | 3/2001 | Mazur | B60R 22/48 280/735 |
| 6,302,438 B1* | 10/2001 | Stopper, Jr. | B60R 21/0154 280/735 |
| 6,416,080 B1* | 7/2002 | Gillis | B60R 21/01508 280/735 |
| 6,439,333 B2* | 8/2002 | Domens | B60R 21/33 180/268 |
| 6,581,960 B1 | 6/2003 | Schondorf et al. | |
| 6,623,032 B2* | 9/2003 | Curtis | B60R 22/00 280/735 |

(Continued)

FOREIGN PATENT DOCUMENTS

| | | |
|---|---|---|
| CN | 205059529 U | 3/2016 |
| DE | 102010014366 A1 | 11/2010 |

(Continued)

OTHER PUBLICATIONS

English translation of Chinese Patent Pub. No. CN103010152A that was filed in 2012 (Jul. 7, 2018).*

(Continued)

*Primary Examiner* — Jean Paul Cass
(74) *Attorney, Agent, or Firm* — Frank A. MacKenzie; Bejin Bieneman PLC

(57) ABSTRACT

A belt assembly includes a belt, a first sensor and a second sensor. The belt has a webbing and a plurality of markers distinct from the webbing and fixed thereto. The markers are equally spaced a first longitudinal distance thereon in a longitudinal direction. The first sensor and the second sensor each have an associated detection field directed toward the belt and responsive to the markers in the fields. The second sensor is a second longitudinal distance from the first sensor differing from the first distance.

20 Claims, 8 Drawing Sheets

(56) References Cited

U.S. PATENT DOCUMENTS

| | | | | |
|---|---|---|---|---|
| 6,853,898 B2* | 2/2005 | Farmer | ................... | G06T 7/277 |
| | | | | 180/169 |
| 6,867,690 B2* | 3/2005 | Gioutsos | ................ | B60N 2/002 |
| | | | | 200/61.54 |
| 6,918,458 B2* | 7/2005 | Knox | ................ | B60R 21/01546 |
| | | | | 180/268 |
| 7,163,265 B2* | 1/2007 | Adachi | ................ | B60N 2/2806 |
| | | | | 297/250.1 |
| 7,359,782 B2* | 4/2008 | Breed | ................ | B60R 21/0134 |
| | | | | 180/274 |
| 7,576,642 B2* | 8/2009 | Rodemer | ........... | A61B 5/02438 |
| | | | | 280/735 |
| 7,698,038 B2 | 4/2010 | Odate | | |
| 8,036,795 B2* | 10/2011 | Allen | ................ | B60R 21/01538 |
| | | | | 180/268 |
| 8,041,483 B2* | 10/2011 | Breed | ................ | B60R 21/0134 |
| | | | | 192/113.35 |
| 8,090,504 B2* | 1/2012 | Long | ................ | B60R 22/48 |
| | | | | 180/286 |
| 8,116,528 B2* | 2/2012 | Allen | ................ | G06K 9/00362 |
| | | | | 382/104 |
| 8,195,356 B2* | 6/2012 | Allen | ................ | G01M 17/00 |
| | | | | 701/29.8 |
| 8,195,365 B2* | 6/2012 | Bernhagen | ............ | B60R 22/48 |
| | | | | 280/801.1 |
| 9,073,506 B2* | 7/2015 | Baur | ................ | B60N 2/688 |
| 9,676,356 B2* | 6/2017 | Ghannam | ................ | B60R 22/48 |
| 10,000,186 B2* | 6/2018 | Le | ................ | B60R 21/01548 |
| 2008/0236275 A1* | 10/2008 | Breed | ................ | B60C 11/24 |
| | | | | 73/290 V |
| 2014/0062151 A1* | 3/2014 | Banghart | ............ | B60N 2/2863 |
| | | | | 297/253 |
| 2014/0117139 A1 | 5/2014 | Odate | | |
| 2015/0367800 A1* | 12/2015 | Zhang | ................ | B60R 22/24 |
| | | | | 280/733 |
| 2016/0001781 A1* | 1/2016 | Fung | ................ | B60W 40/08 |
| | | | | 701/36 |
| 2016/0318473 A1* | 11/2016 | Leckliter | ................ | B60R 22/18 |

FOREIGN PATENT DOCUMENTS

| | | |
|---|---|---|
| GB | 2549392 A | 10/2017 |
| GB | 2555712 A | 5/2018 |
| JP | 2005297781 A | 10/2005 |
| KR | 101266117 B1 | 5/2013 |
| KR | 1020160074105 | 6/2016 |

OTHER PUBLICATIONS

Search Report issued by the United Kingdom Intellectual Property Office dated May 23, 2018 regarding GB Application No. 1719658.5 (5 pages).

* cited by examiner

BELT ASSEMBLY ALLOWING PAYOUT MEASUREMENT

BACKGROUND

Restraint systems in a vehicle may adjust system performance based on an assigned classification of an occupant, with such classification based at least in part on a perceived size of the occupant. One example of adjusting system performance is found in the operation of an airbag assembly. Operation parameters of an airbag assembly, e.g., inflation time, inflation pressure, venting/tethering, etc., may be adjusted during a vehicle impact based on the classification of the occupant. As another example, operation of a belt assembly, e.g., pre-tensioning, locking, load limiting, etc., may be adjusted based on the classification of the occupant. An opportunity remains to design a belt measurement system to collect information about the occupant.

DETAILED DESCRIPTION

Introduction

Figure 1:
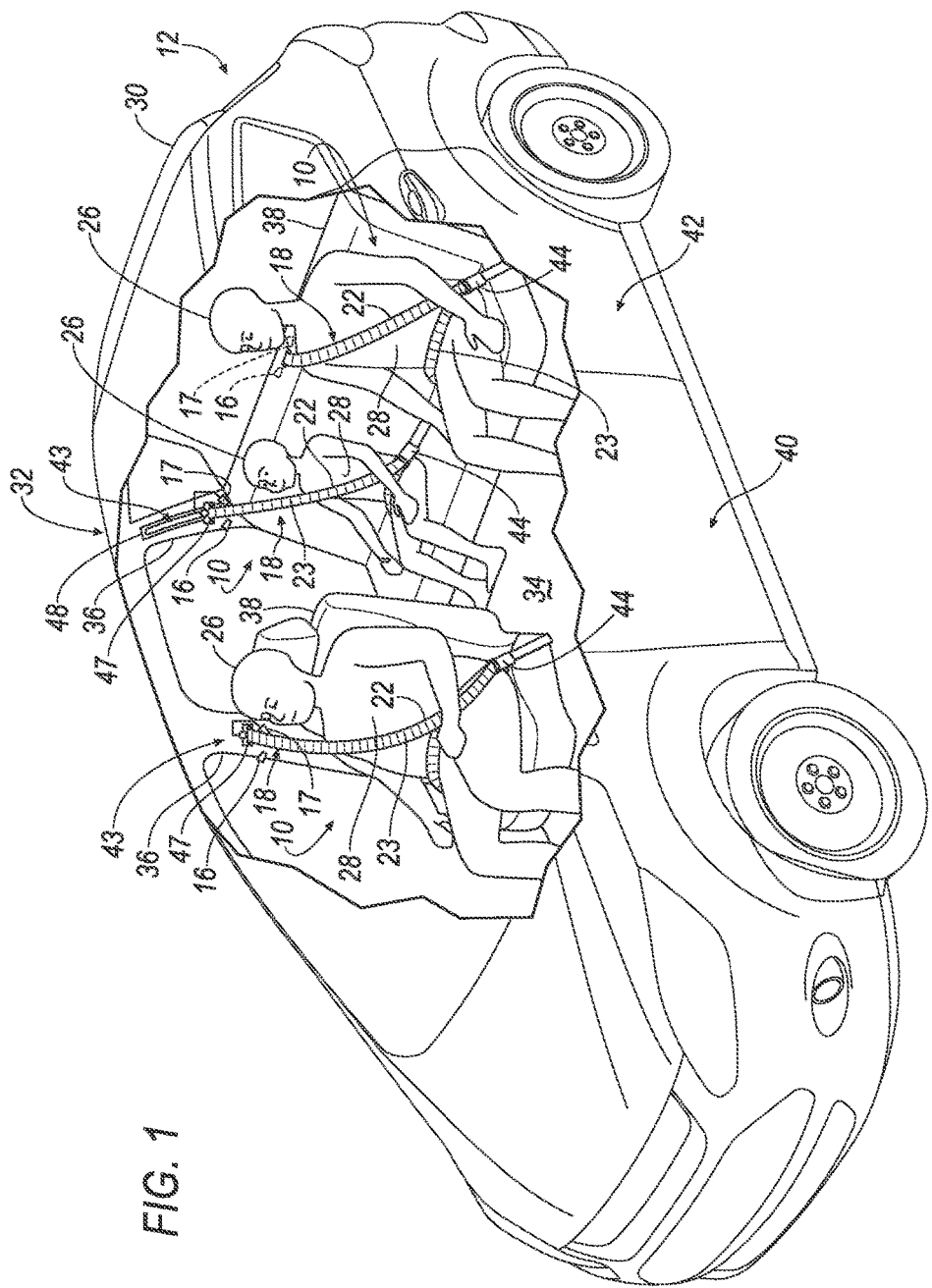
FIG. 1 is a perspective view of a vehicle including a plurality of belt assemblies.

A belt assembly includes a belt, a first sensor and a second sensor. The belt has a webbing and a plurality of markers distinct from the webbing and fixed thereto. The markers are equally spaced a first longitudinal distance thereon in a longitudinal direction. The first sensor and the second sensor each have an associated detection field directed toward the belt and responsive to the markers in the fields. The second sensor is a second longitudinal distance from the first sensor differing from the first distance.

Relative orientations and directions (by way of example, upper, lower, bottom, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a driver seat, facing a dashboard. In the Figures, like numerals indicate like parts throughout the several views.

Exemplary System Elements

With reference to the Figures, particularly FIGS. 1 through 4, a belt assembly 10 for a vehicle 12 includes a belt retractor 14, a pair of co-located sensors including a base or first sensor 16 and a reference or second sensor 17, and a belt 18 retractably payable from the belt retractor 14. Each of sensors 16 and 17 have a respective detection field 19, 20. Belt 18 has a webbing 22, and has a plurality of markers 23 fixed to the webbing 22. The webbing 22 has a longitudinal length and a lateral width. The webbing 22 of the belt 18 may be formed of a fabric woven as a flat strip, or alternatively as a tube. The fabric may be formed of polyester, nylon, or any other material. The markers 23 may be formed of a first material, as described further below, and the belt 18 may have isolating regions formed of a second material different than the first material. The second material may be provided by the fabric defining the webbing 22.

Various technologies may be used to print or impregnate the webbing 22 with the markers 23. The markers 23 may be printed on the webbing 22. Alternatively, the markers 23 of the belt 18 may be impregnated inside the webbing 22, or woven into the webbing 22. When the webbing 22 is a tube, and the sensors 16, 17 are not optical sensors, the markers 23 may be disposed inside the tube. The non-optical markers may include metal and may be sensed when inside the tube, even when not visible from an outside of the tube. Yet alternatively, the markers 23 may be holes defined in the webbing 22.

Figure 2:
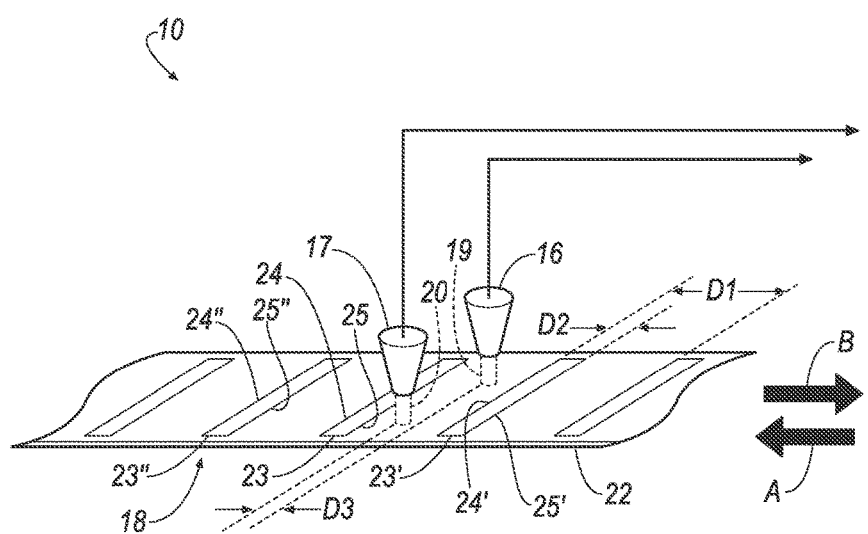
FIG. 2 is the perspective view of a belt and sensors of the belt assembly.

The markers 23 may be disposed in an alternating relationship with the isolating regions along the longitudinal length of the webbing 22. The isolating regions may be fabric material of the webbing 22 disposed between adjacent markers 23. The markers 23 are equally spaced along the longitudinal length of the webbing 22 and may extend across substantially the entire lateral width of the webbing 22. The markers 23 have leading or first edges 24 separated by a first distance D1. The markers 23 have trailing or second edges 25 also separated by the first distance D1. The first and second edges 24 and 25 are separated by a length of the marker 23 that equals a second distance D2. Sensors 16 and 17 are separated by a third distance D3 as shown in FIG. 2. The distance between The sensors 16, 17 are positioned relative to the belt 18 so that the markers 23 move through the detection fields 19, 20 and so that any one marker 23 does not enter both detection fields 19, 20 at the same time. D3 is less than half of D1. An exemplary value of D3, consistent with the Figures, is one quarter of D1.

The sensors 16, 17 each generate a signal responsive to a passage of each marker 23 through the detection fields 19, 20. With continued reference to the Figures, the sensors 16, 17 may be proximity sensors also known as contactless sensors. The sensors 16, 17 may each be a magnetic sensor, inductive sensor, optical sensor, or any other type of contactless sensor. Alternative types of sensors that may be used as sensors 16, 17 are discussed in more detail below. The sensors 16, 17 detect the presence of the markers 23 without any physical contact. Additionally, the sensors 16, 17 may detect the size, shape, material and other characteristics of the marker 23. The exemplary markers 23 may be rectangular in shape. A range in which the sensors 16, 17 may detect the markers 23 is called the detection field 19, 20 for sensors 16, 17 respectively. The detection fields 19, 20 may have a shape as shown in FIG. 2 or various other shapes.

The signals are used to determine both a count of the markers 23 moving past sensors 16, 17, and, as described in more detail below, a direction of movement of the markers 23 past sensors 16, 17. A combination of the marker count and the direction allows a determination of a net extension of the webbing 22 from the belt retractor 14 in transitioning from an unbuckled condition illustrated in FIG. 3 to a buckled condition illustrated in FIG. 1. The net extension or change in longitudinal length of the webbing 22 is referred to herein as the delta length.

Tracking both the marker count and the direction of movement of the markers 23 allows determination of both an amount of webbing paid out of the belt retractor 14 and the amount of webbing received by the belt retractor 14, allowing a determination of the delta length. The delta length allows an estimation of a size of an occupant 26, and more particularly a size of a torso 28 of the occupant 26. The delta length increases with a torso girth and a torso length of torso 28. For example, the delta length for a larger occupant is longer than the delta length of the webbing 22 for a smaller occupant, e.g., a child. The delta length may be used to determine the size of the occupant 26. The delta length accounts for retractions of the webbing 22 when the belt 18 is buckled and snugged up or tightened. The occupant 26 of the vehicle 12 may be classified based at least on the size of the occupant 26. The classification may also consider other factors such as occupant weight and seat position as discussed below, as the estimated size of the occupant 26 based on delta length alone may be misleading when the occupant 26 is in a removable child seat (not shown) or booster seat (not shown) placed on seat 38.

Various systems in a vehicle 12 may adjust performance based on the classification of the occupant 26. For example, operation of an airbag assembly (not shown) of the vehicle 12 may be adjusted, e.g., inflation time, inflation pressure, venting/tethering, etc., during a vehicle impact based on the classification of the occupant 26. As another example, operation of the belt assembly 10, e.g., pre-tensioning, locking, load limiting, etc., may be adjusted based on the classification of the occupant 26.

As shown in FIG. 1, the example vehicle 12 may include a vehicle body 30 including a roof 32, a floor 34, and a plurality of pillars 36. The vehicle body 30 may have a unibody construction, a body-on-frame construction, or any other suitable construction. The vehicle body 30 may also include a convertible body construction with no fixed roof 32.

The vehicle 12 may include one or more seats 38. For example, as shown in FIG. 1, the vehicle 12 may include a plurality of seats 38. The vehicle 12 may include a plurality of belt assemblies 10 disposed adjacent the seats 38, or alternatively incorporated into the seats 38.

The seats 38 may be supported by the floor 34. Alternatively, the seats 38 may be supported by the pillars 36. The seats 38 may be arranged in any suitable arrangement. The seats 38 may be arranged in a front row 40 and a rear row 42. The seat 38 may be, for example, a bucket seat, a bench seat, or any other suitable type of seat. The seats 38 may be mounted in a fixed position to the floor 34 as shown in FIG. 1. Alternatively, the seats 38 may be selectively moveable relative to the floor 34, e.g., in a vehicle fore-and-aft direction and/or a cross-vehicle direction.

Figure 3:
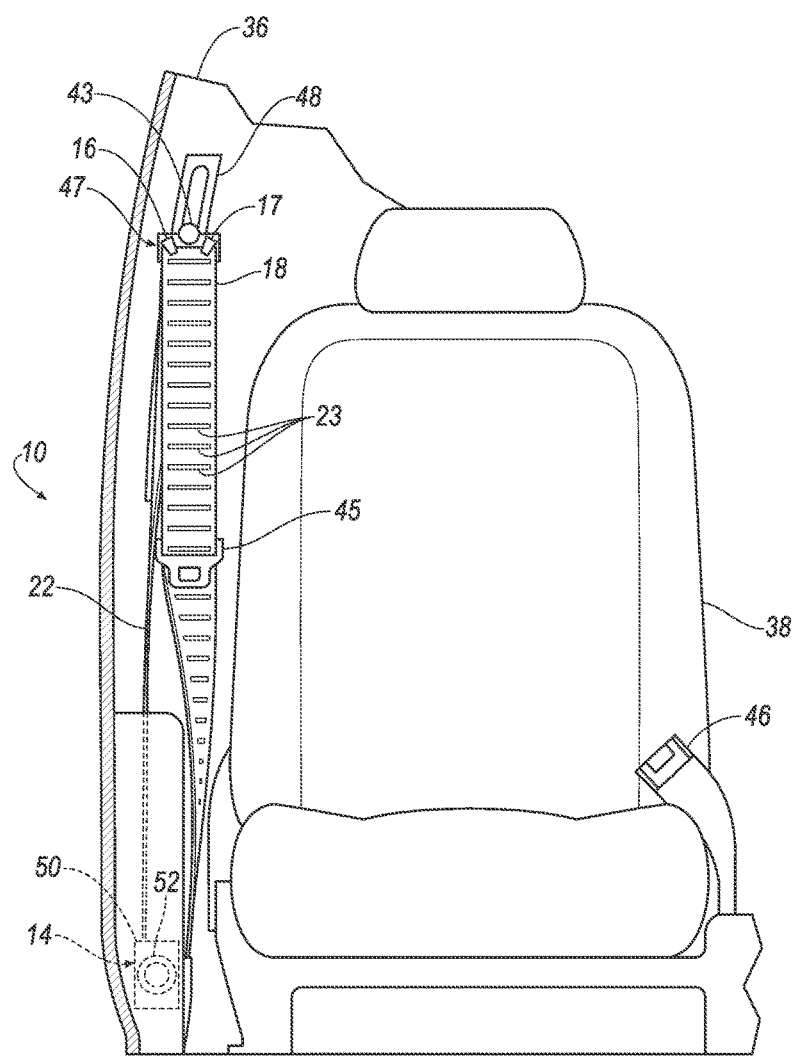
FIG. 3 is the front view of a right front seat portion of the vehicle including one belt assembly in an unbuckled condition.

The belt assembly 10 may include an anchor point 43 spaced from the belt retractor 14 and slideably receiving the webbing 22. The anchor point 43 may position the belt 18 to restrain the torso 28 of the occupant 26 during the vehicle impact. The belt 18 may be mounted at three points, as shown in FIGS. 1 and 3, or it may be mounted at two or four points. The three point belt assembly 10 may include a first buckle assembly 44 including a tongue 45 slideably disposed on webbing 22 and a latch mechanism 46 that receives and releasably engages tongue 45. Latch mechanism 46 may be fixed to one of the seat and the vehicle structure including the floor 34 and the pillar 36. The anchor point 43 may, for example, include a D-ring 47 that slideably receives the webbing 22. The anchor point 43 may be mounted to the pillar 36, or to the roof 32, e.g., for a middle seat of the vehicle 12. Alternatively the anchor point 43 may be fixed to a seatback of the seat (not shown).

As shown in FIGS. 1 and 3, the anchor point 43 may be adjustably mounted to the pillar 36. Accordingly, the anchor point 43 may be adjustable to accommodate height and girth differences of occupants 26. With continued reference to FIGS. 1 and 3, the belt assembly 10 may include a track 48 fixed relative to the pillar 36 and the belt retractor 14, and the anchor point 43 may be releasably lockable to the track 48 at fixed points along the track 48. Thus, the anchor point 43 may be released from a first fixed point of the track 48 and moved to and locked in a second fixed point of the track 48 to adjust the position of the anchor point 43 on the track 48.

Figure 4:
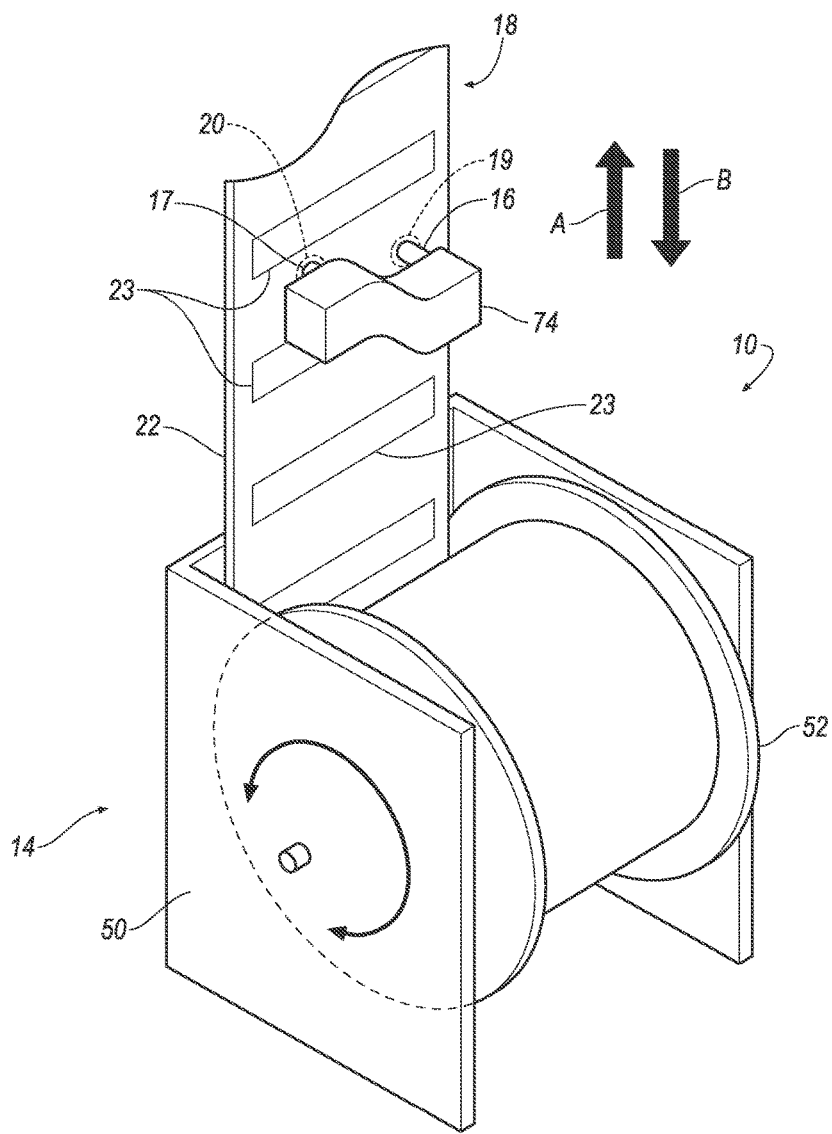
FIG. 4 is the perspective view of a belt retractor showing the sensors.

As shown in FIG. 4, the belt retractor 14 may include a housing 50 and a spool 52 receiving the belt 18 in the housing 50. The housing 50 of the belt retractor 14 may be fixed to the pillar 36, the floor 34 or any other suitable position. The belt 18 may be coiled or uncoiled around the spool 52 as the belt 18 moves into or out of the belt retractor 14 respectively.

The sensors 16, 17 of FIG. 4 are positioned to detect movement of the markers 23 therepast as the belt 18 moves into and out of the belt retractor 14. The sensors 16, 17 may be supported by the anchor point 43 (as shown in FIGS. 1 and 3), the belt retractor 14 (as shown in FIG. 4), the pillar 36, or any other suitable position. The sensors 16, 17 may be incorporated into an integrated sensor assembly 74, discussed below and mounted in a suitable location. A suitable location will be one where the belt 18 may be maintained in a substantially consistent orientation and position relative to sensors 16, 17 while belt 18 is being out and retracted. In the configuration where the sensors 16, 17 are supported by the anchor point 43, the sensors 16, 17 may move with the anchor point 43 relative to the pillar 36. The sensors 16, 17 may be concealed from an occupant compartment of the vehicle 12 by interior trim components (not numbered). Exemplary alternative locations for sensors 16, 17 include a location at the D-ring 47 as shown in FIGS. 1 and 3, and a location at the retractor 14 as shown in FIG. 4.

Figure 5:
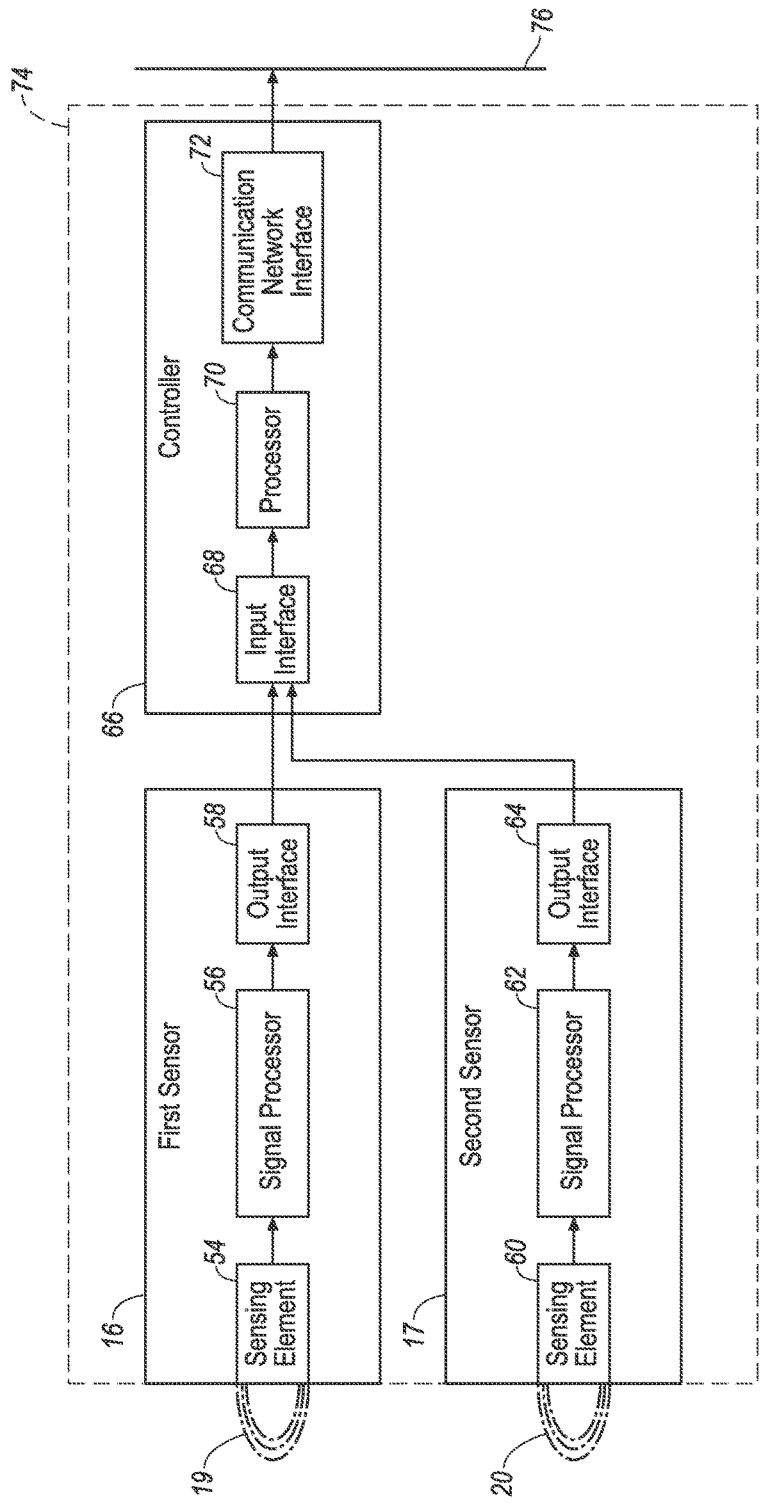
FIG. 5 is a block diagram including the sensors and a controller.

Sensors 16 and 17 may be smart sensors that include processors. As shown in FIG. 5, the first sensor 16 may include a first sensing element 54, a first signal processor 56, and a first output interface 58. Likewise, the second sensor 17 may include a second sensing element 60, a second signal processor 62, and a second output interface 64. The signal processors 56, 62 may condition and process raw signals from sensors into, for example, a format compatible for use by other processors of assembly 10. The signal processors 56, 62 may also each be programmed for other tasks, including, by way of example, confirming the signals from the sensors 16 and 17 are indicative of a displacement of the markers 23 of the belt 18 past sensors 16 and 17.

Sensing elements 54, 60 may be of any of several types of sensors. As suggested above by the alternative types of sensors identified, exemplary types of sensing elements may include magnetic sensing elements, inductive sensing elements, optical sensing elements, capacitive sensing elements, and any other type of contactless sensor. Some of the alternative sensors are described in further detail below.

Sensors 16, 17 may be optoelectronic proximity sensors. Optoelectronic proximity sensors sense and distinguish both an absence and presence of the markers 23 when the markers 23 have reflectivity characteristics differing from those of the surrounding webbing. The sensing elements 54, 60 of the optoelectronic proximity sensors may have both an emitter element (not shown) and a receiver element (not shown) integrated into sensing elements 54, 60. Emitter elements of sensing elements 54, 60 may be any suitable light source, e.g., a laser or an infrared light emitting diode. The receiving element may be a photoelectric receiver. In practice, the light source may emit light toward the webbing 22. Light from the light source striking the webbing is reflected back toward the photoelectric receiver. Light reflected by the markers has a first characteristic. Light reflected by the non-marker part of the webbing 22 has a second characteristic that the processors 56 and 62 are able to distinguish. For example, the reflective intensity or a wave length of the reflected light from the markers 23 may be different from the reflective intensity or the wave length of the light reflected from the webbing 22. Alternatively, markers 23 may be in the form of holes that may not reflect any light. Processors 56 and 62 may be programmed to recognize a lack of reflected light, or a significant diminution of the reflected light as the occurrence of movement of the marker past the sensors 16, 17.

As noted above, the sensors 16, 17 may be inductive proximity sensors. Like the optoelectronic proximity sensors described above, inductive proximity sensors may have both an emitter element (not shown) and a receiver element (not shown) integrated into sensing elements 54, 60. The inductive proximity sensors may use the emitting element to emit an electromagnetic field and may use the sensing element to sense changes in the electromagnetic field induced by the marker 23. The markers 23 may be formed of any electrically conductive material, including, for example, copper and iron.

As another example, the sensors 16, 17 may be capacitive proximity sensors. The capacitive proximity sensor may rely on a difference in dielectric characteristics of the webbing 22 versus the markers 23.

As yet another example, the sensors 16, 17 may be magnetic proximity sensors. The magnetic proximity sensor may rely on a difference in magnetic characteristics of the webbing 22 versus the markers 23. The markers may include a ferrous element.

The output interfaces 58, 64 of sensors 16, 17 may report each sensing of a marker 23 detected by sensing elements 54, 60. Signals provided by interfaces 58, 64 may be provided as either an analog or a digital signal to a controller, e.g. a belt system controller 66 or a restraint system controller. The system controller 66 may have a system input interface 68 adapted to connect with a plurality of sensor output interfaces 58, 64. The input interface 68 communicates data to a system processor 70, and generates output data. Output data from processor 70 may be communicated via a system communication network interface 72. Interface 72 connects to a vehicle communications network or bus 76, e.g. a Control Area Network ("CAN") or a Local Interconnect Network ("LIN") or other communications interface. Controller 66 and sensors 16 and 17 may be integrated into an integrated displacement sensor assembly 74 connected to the vehicle communications network 76. Alternatively, the interfaces 58, 64 may connect directly to the CAN or LIN to provide the output of sensors 16, 17 to a vehicle electronic control unit ("ECU").

Figure 6A:
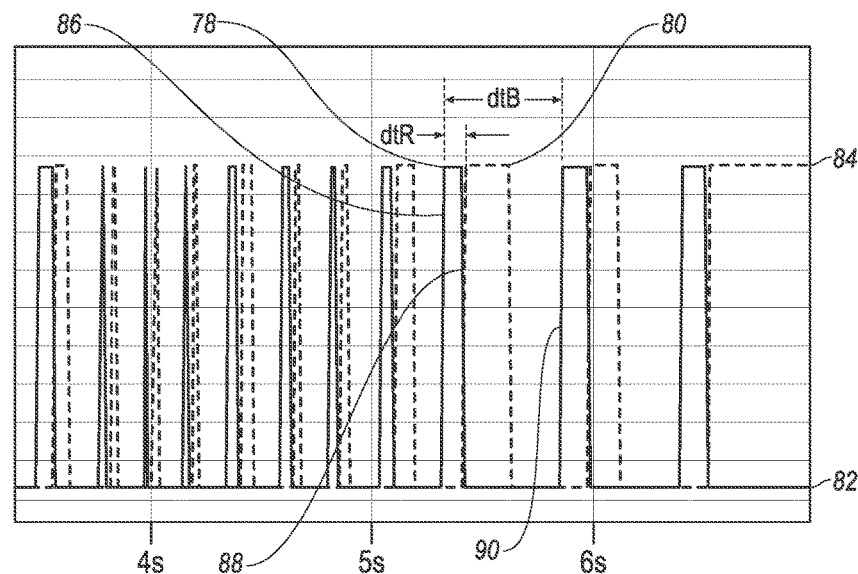
FIG. 6A is a plot of sensor output for the belt moving past the sensors in a first direction.
Figure 6B:
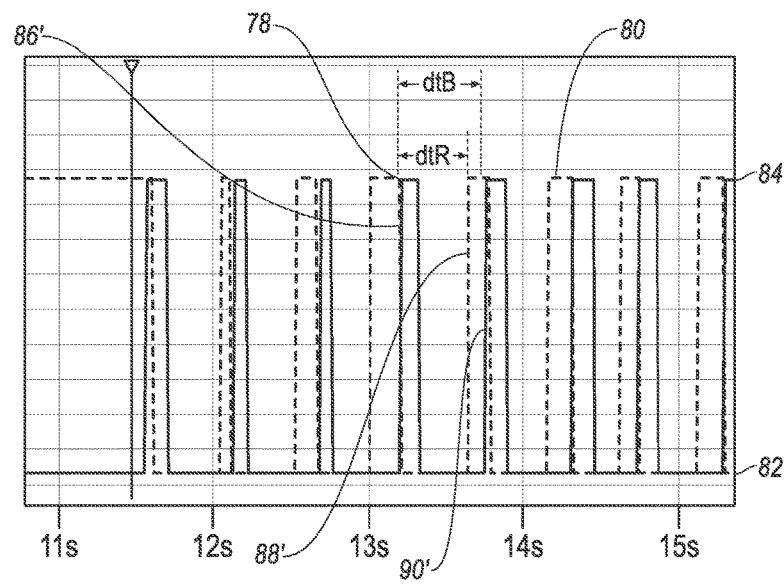
FIG. 6B is a plot of sensor output for the belt moving past the sensors in a second direction.

Example signals from sensors 16 and 17 are shown in FIGS. 6A and 6B. Sensors 16 and 17 sense the markers 23 as the markers 23 enter the respective detection fields 19, 20 of sensors 16 and 17. A base or first signal 78 is provided by sensor 16 and a reference or second signal 80 is provided by sensor 17. The exemplary plots of 6A and 6B are of the example signals 78 and 80 as a function of time. The plot of FIG. 6A is generated when webbing 22 of FIG. 2 is moving in the direction of arrow A, arrow A indicating a direction of belt travel, toward the left edge of the page. The plot of FIG. 6B is generated when the webbing 22 of FIG. 2 moves in the direction of arrow B, arrow B indicating the direction of belt travel, toward the right edge of the page. The plots are substantially binary for each of signals 78 and 80. At a plot base 82, the sensors are indicating the lack of presence of a marker 23. At a plot peak 84, the sensors 16, 17 are indicating the presence of a marker 23. Vertical steps or lines from the base 82 to the peak 84 indicate that the marker 23 has just been sensed by the sensor associated with that trace.

Referencing FIG. 2 as well as FIG. 6A, a first vertical step 86 is generated by sensor 16 as the leading edge 24 of the marker 23 enters the detection field 19 of the sensor 16. A second vertical step 88 is generated by sensor 17 as the leading edge 24 of the marker 23 is sensed by sensor 17 on entering field 20. A third vertical step 90 is generated by sensor 16 as a leading edge 24' of a first adjacent marker 23' is sensed by sensor 16. A marker time gap dtB is indicative of a time between the passage of each of the leading edge 24 and the leading edge 24' past sensor 16. A reference time gap dtR is indicative of a time between the leading edge 24 passing sensor 16 and passing sensor 17.

Referencing FIG. 2 as well as FIG. 6B, a first vertical step 86' is generated by sensor 16 as the trailing edge 25 of the marker 23 is sensed by sensor 16. A second vertical step 88' is generated by sensor 17 as the trailing edge 25" of a second adjacent marker 23" is sensed by sensor 17. A third vertical step 90' is generated by sensor 16 as the trailing edge 25" of the marker 23" is sensed by sensor 16. A marker time gap dtB is indicative of a time between each of the trailing edge 25 and the trailing edge 25" passing sensor 16. A reference time gap dtR is indicative of a time between the trailing edge 25 passing sensor 16 and trailing edge 25" passing sensor 17.

The processor 70 may be programmed to determine the delta length of the webbing 22 based at least on the detection of the markers 23 by the sensors 16, 17. Alternatively, as when the sensors 16, 17 interface directly with the network 76, the vehicle ECU may be programmed to determine the delta length of the webbing. A method for determining the delta length is described below.

The processor 70 is illustrated as embedded in, i.e. integrated into, the system controller 66. Controller 66 may include any of a microcontroller, a discrete restraint system controller, and the vehicle ECU. Controller 66 includes the processor 70 and may include a memory and may be a computing device, i.e. a computer. The memory of the controller 66, when provided, may store instructions executable by the processor 70. The processor 70 may read the instructions from the memory and execute the instructions. The delta length of the webbing 22 paid out may be communicated to other controllers, e.g., an airbag controller, through the communication network interface 72 connected to the communications network 76. The delta length of webbing 22 may also be communicated to other software programs stored within the memory of controller 66.

Processing

Figure 7:
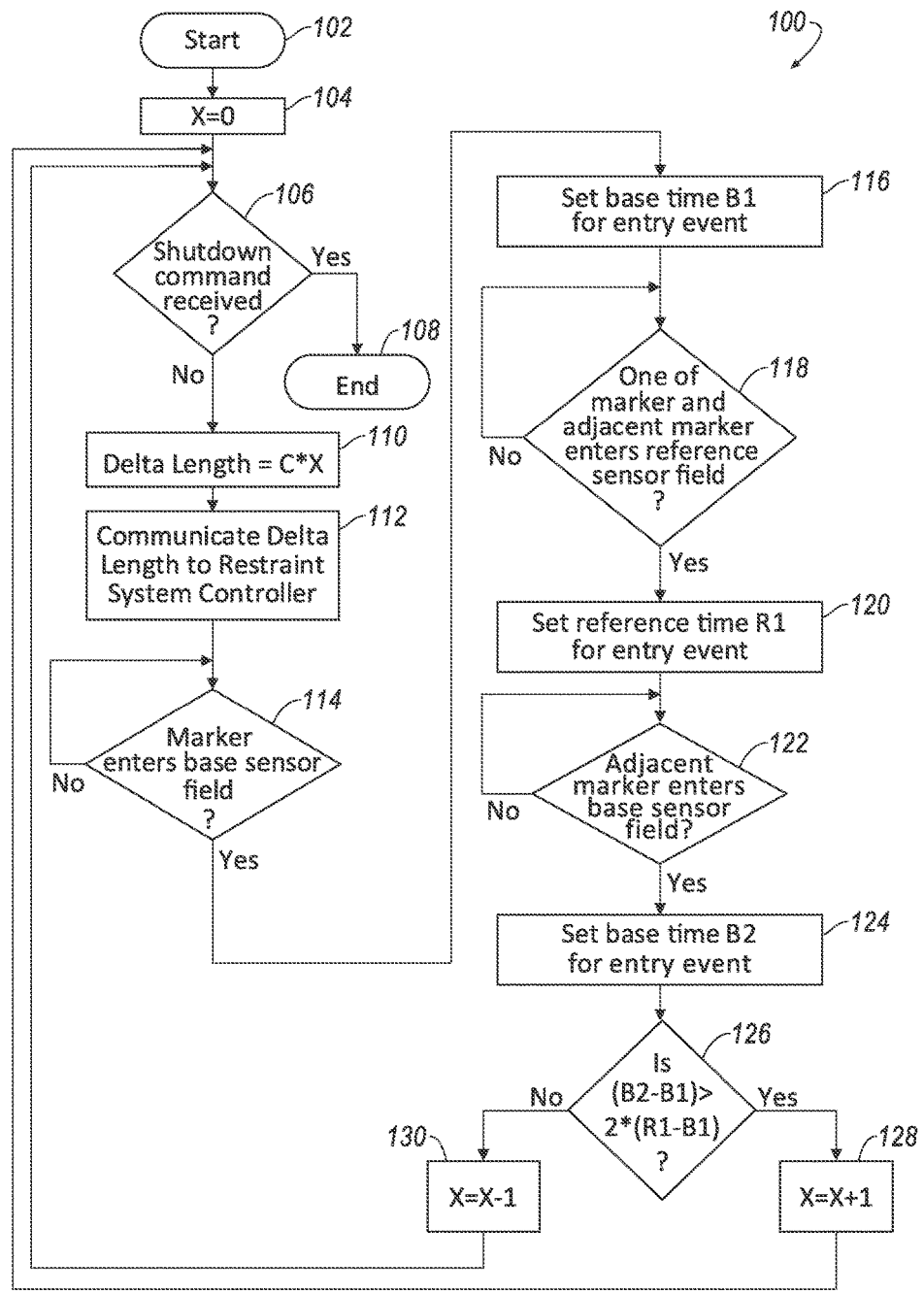
FIG. 7 is a flowchart of a process executed by the belt assembly.
Figure 8:
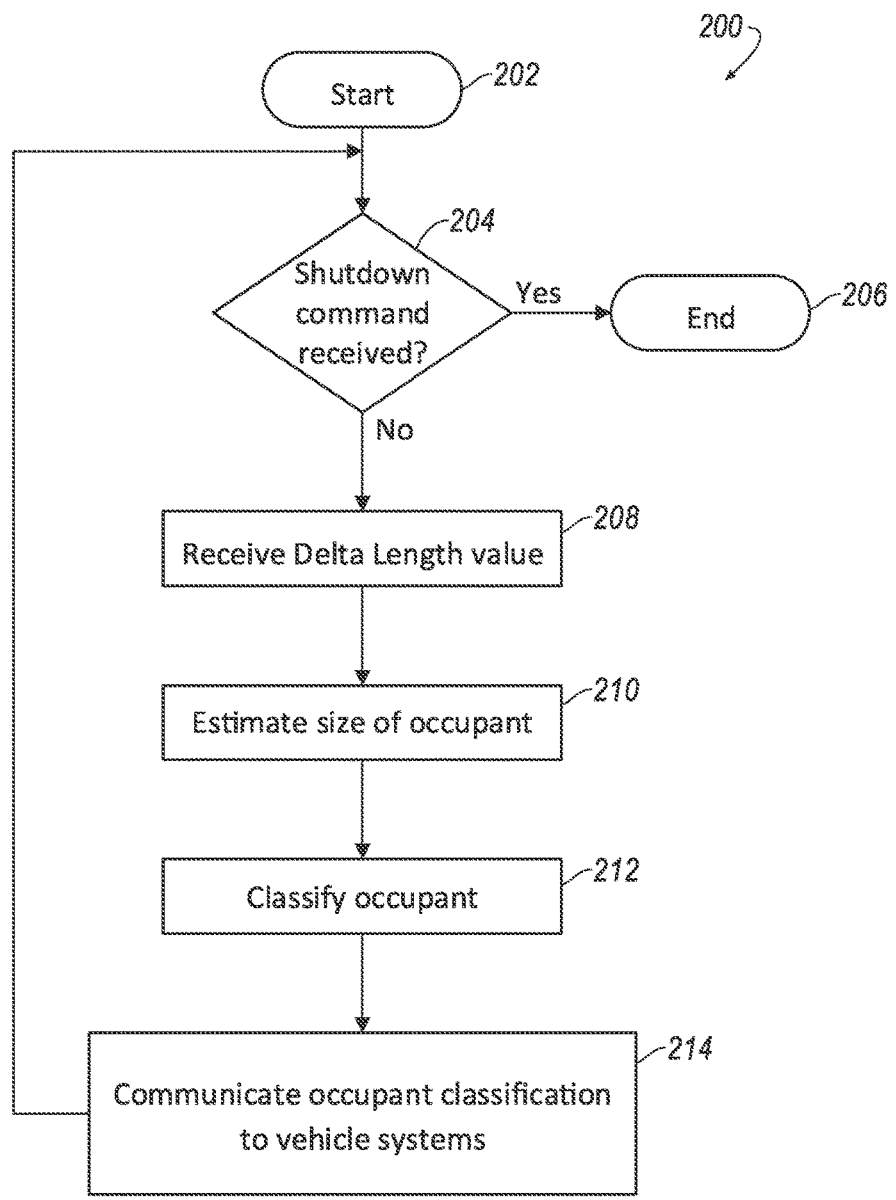
FIG. 8 is a flowchart of a classification process that may be executed by the belt assembly.

FIG. 7 illustrates a belt length change measurement process 100 that may be stored in the controller 66 or in an ECU of vehicle 12. The controller 66 or the ECU executes the steps illustrated in FIG. 7 as described below. A computer program for executing process 100 is instantiated in start block 102, e.g., when a belt 18 is first displaced from the unbuckled or released condition illustrated in FIG. 3, or when a power-on command is issued, as may be associated with the vehicle being powered up responsive to an approach or a touch by a vehicle passenger or operator.

Next, process block 104 sets a variable X equal to zero. The variable X is used to count the number of markers 23 that move past the sensors 16, 17. Process 100 then moves to decision block 106. Decision block 106 checks and determines whether a vehicle shutdown command has been received, or, in the alternative (not illustrated), that the power-on command has been received. Both the shutdown command and the power-on command may come from a vehicle operator and a power controller, e.g., body control module power, seat control module power, or turning an ignition key between an on and an off position. Such commands may also come from a wireless network in the case of autonomous vehicles. When the shutdown command has been confirmed as received, or alternatively, when the power-on command is not confirmed, process 100 moves to end block 108 and terminates. While not illustrated, process 100 may also include a step to confirm that the belt has been restored to the unbuckled condition before terminating.

When decision block 106 determines that the shutdown command has not been received, or, alternatively, that the power-on command has been confirmed, process 100 proceeds to process block 110. Process block 110 sets a value for a change in displaced belt length, or the Delta Length, equal to a constant multiplied by the current value of variable X. The term value for the delta length is capitalized in this part of the description as "Delta Length" to indicate its use as a variable by the controller 66 or the ECU. Process block 112, following block 110, communicates the Delta Length value to the restraint system controller, which may be, by way of example, either the controller 66 or the ECU.

Process 100 moves to decision block 114. Decision block 114 determines whether a marker 23 has entered the detection field 19 of first sensor 16. Such a determination may be made when the signal 78 from the first sensor increases to a predetermined signal magnitude as may be represented by the plateaus at plot peak 84 illustrated in FIGS. 6A and 6B. Line or step 86 of FIG. 6A and line and line 86' of FIG. 6B each evidence the marker 23 entering the first sensor detection field 19. When no indication of a marker 23 entering field 19 has been received, process 100 loops back to decision block 114 to repeat the check for entry of a marker 23 into field 19. When such an entry has been detected as evidence by occurrence of line 86 or 86', process 100 moves to process block 116. Process block 116 sets a value for a first base time B1. The time value is a relative time value as may be provided by the processor 70 responsive to detection of entry of marker 23 into field. The relative time value may be an instantaneous clock time value, e.g., for a 24 hour clock, 15:23:17.032, representative of 15 hours, 23 minutes, and 17.032 seconds.

After setting time B1, process 100 moves to decision block 118. Decision block 118 determines when the first marker 23, or, referencing FIG. 2, second adjacent marker 23", enters the detection field 20 after time B1 has been established. When no indication of a marker 23 or 23" entering field 20 has been received, process 100 loops back to decision block 118 to repeat the check for entry of a marker 23 or 23" into field 20. When such an entry has been detected as evidence by occurrence of line 88 or 88', process 100 moves to process block 120. Process block 120 sets a value for a reference time R1.

After setting time R1, process 100 moves to decision block 122. Decision block 122 determines when first adjacent marker 23' or second adjacent marker 23" enters the detection field 19 after time R1 has been established. When no indication of a marker 23' or 23" entering field 19 has been received, process 100 loops back to decision block 122 to repeat the check for entry of a marker 23' or 23" into field 19. When such an entry has been detected as evidence by occurrence of line 90 or 90' respectively, process 100 moves to process block 124. Process block 124 sets a value for a second base time B2.

After setting time B2, process 100 moves to decision block 126. Decision block 126 determines when the value of the marker time gap dtB, alternatively labeled as the time period between the times B2 and B1 or (B2−B1), is greater than two times the value of the reference time gap dtR, alternatively labeled as twice the time period between the times R1 and B1, or 2*(R1−B1). When yes, process block 128 updates the value of X to X+1, consistent with the retractor paying out a length of belt equal to D1. When no, process block 130 updates the value of X to X−1, consistent with the retractor 14 retracting a length of belt equal to D1. Process 100 then circles back from each of blocks 128 and 130 to an input side of decision block 106 to continue checking for changes in the delta length of the belt 18.

Figure illustrates an exemplary classification process 200 for classifying an occupant that may be executed by the belt assembly 10 or by a restraint controller module or by any other suitable vehicle module which receives delta length value via the vehicle communications network 76. The processor 70 may be programmed to execute the classification process 200. The classification process 200 may classify the occupant 26 of the seat 38 in various classes. This information may be used by other systems in the vehicle 12, e.g., to improve the performance of the other systems. A computer program for executing process 200 may be instantiated in start block 202 coincident with when process 100 is instantiated, e.g., when a belt 18 is first displaced from the unbuckled or released condition illustrated in FIG. 3.

Process 200 moves to decision block 204. Decision block 204 checks and determines whether a vehicle shutdown command has been received. As in process 100, the shutdown command may come from a vehicle operator, e.g., pushing a vehicle stop button, or turning an ignition key to an off position. Shutdown commands may also come from a wireless network in the case of autonomous vehicles. When the shutdown command has been confirmed as received, process 200 moves to end block 206 and terminates. While not illustrated, process 200 may also include a step to confirm that the belt has been restored to the unbuckled condition before terminating. When decision block 204 determines that the shutdown command has not been received, process 200 proceeds to process block 208.

At block 208, the classification process may retrieve the current delta length that may be calculated by the process 100. At block 210, the size of the occupant 26 may be estimated. Size estimation may also take into account other information provided by any other system in the vehicle 12, e.g., the weight of the occupant 26, and a position of the seat 38. At block 212, the class of the occupant 26 may be determined. The classes may be in form of discrete values, e.g., small, medium, and large. Alternatively, it may be in form of values describing physical characteristics of the occupant 26 like height, girth measurement, etc. At block 214, the classification process may provide the class of the occupant 26 to other vehicle systems, e.g., the airbag controller.

CONCLUSION

An example belt assembly and method for determining a belt payout have been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

With regard to the references to ECUs in the present description, computing devices such as those discussed herein generally each include instructions executable by one or more computing devices such as those identified above, and for carrying out blocks or steps of processes described above. For example, process blocks discussed above are embodied as computer executable instructions.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a,"

"the," "said," etc. should be read to recite one or more of the indicated elements unless a claim recites an explicit limitation to the contrary.

What is claimed is:

1. A belt assembly comprising:
   a belt having a webbing and a plurality of markers distinct from and fixed thereto equally spaced a first longitudinal distance thereon in a longitudinal direction;
   a first sensor and a second sensor each having an associated detection field directed toward the belt and responsive to the markers in the associated detection fields; and
   the second sensor being a second longitudinal distance from the first sensor, the second longitudinal distance being less than the first longitudinal distance.

2. The belt assembly of claim 1, further comprising a belt retractor with the belt disposed retractably payable thereon.

3. The belt assembly of claim 2, comprising an anchor point spaced from the belt retractor and slideably receiving the webbing, the sensors being adjacent to the anchor point.

4. The belt assembly of claim 2, wherein the sensors are adjacent to the belt retractor.

5. The belt assembly of claim 1, wherein the markers are substantially rectangular in shape and substantially parallel to each other.

6. The belt assembly of claim 5, wherein the markers are elongated substantially perpendicular to the longitudinal direction of the webbing.

7. The belt assembly of claim 1, wherein the sensors are substantially identical.

8. The belt assembly of claim 1, wherein the sensors are proximity sensors.

9. The belt assembly of claim 1, wherein the second longitudinal distance is less than half the first longitudinal distance.

10. The belt assembly of claim 9, wherein the second longitudinal distance is substantially equal to one fourth the first longitudinal distance.

11. The belt assembly of claim 1, further comprising a computing device in communication with both sensors, the computing device programmed to determine:
   occurrences of entry of at least one of the markers into the detection fields of the sensors, and
   a direction of belt travel associated with the occurrences of entry.

12. The belt assembly of claim 11, further comprising a belt retractor with the belt disposed retractably payable thereon, and wherein the computing device is further programmed to determine a length of the webbing paid out of the belt retractor based on the direction of belt travel.

13. The belt assembly of claim 11, wherein the computing device is further programmed to:
   establish a first time period equal to a time period between:
      a first marker being sensed as entering into the detection field of the first sensor, and
      an adjacent marker being sensed as entering into the detection field of the first sensor; and
   establish a second time period equal to a time period between:
      the first marker being sensed as entering into the detection field of the first sensor, and
      one of the first marker and the adjacent marker being sensed as entering into the detection field of the second sensor, wherein the one of the first marker and the adjacent marker entering into the detection field of the second sensor occurs during the first time period.

14. The belt assembly of claim 13, wherein the computing device is further programmed to:
   determine a ratio of the first time period to the second time period;
   when the ratio is greater than two, identify the direction of belt travel past the sensors as being in a first direction; and
   when the ratio is less than two, identify the direction of belt travel past the sensors as being in a second direction opposite the first direction of belt travel.

15. The belt assembly of claim 1, wherein the markers are formed of electrically conductive material.

16. A method of determining a belt payout, the method comprising the steps of:
   providing a belt having a webbing and a first marker and a second marker, the first marker and the second marker distinct from and fixed to the webbing and equally spaced a first longitudinal distance in a longitudinal direction;
   providing a belt retractor with the belt disposed retractably payable thereon;
   providing a first sensor and a second sensor each having an associated detection field directed toward the belt and responsive to the markers in the fields, and the second sensor being a second longitudinal distance from the first sensor differing from the first longitudinal distance;
   determining a first occurrence of entry of the first marker into the detection field of the first sensor;
   determining a second occurrence of entry of the first marker in the detection field of the second sensor;
   determining a direction of belt travel associated with the first occurrence of entry and the second occurrence of entry; and
   determining a length of webbing paid out of the belt retractor based on at least on the direction of belt travel.

17. The method of claim 16, further comprising the steps of:
   establishing a first time period equal to a time period between:
      a first marker being sensed as entering into the detection field of the first sensor, and
      an adjacent marker being sensed as entering into the detection field of the first sensor; and
   establishing a second time period equal to a time period between:
      the first marker being sensed as entering into the detection field of the first sensor, and
      one of the first marker and the adjacent marker being sensed as entering into the detection field of the second sensor, wherein the one of the first marker and the adjacent marker entering into the detection field of the second sensor occurs during the first time period.

18. The method of claim 17, further comprising the steps of:
   determining a ratio of the first time period to the second time period;
   when the ratio is greater than two, identifying the direction of belt travel past the sensors as being in a first direction of belt travel; and when the ratio is less than two, identifying the direction of belt travel past the sensors as being in a second direction of belt travel opposite the first direction of belt travel.

19. The method of claim 16, further comprising the step of placing the sensors adjacent to the belt retractor.

20. The method of claim 16, further comprising the step of using the length of webbing paid out to classify the seat occupant.

\* \* \* \* \*